(12) United States Patent
Luisi

(10) Patent No.: US 7,893,123 B2
(45) Date of Patent: Feb. 22, 2011

(54) METHOD FOR THE PRODUCTION OF EXPANDED POLYMERIC MATERIALS AND EXPANDED POLYMERIC MATERIAL OBTAINED BY THE METHOD

(75) Inventor: Armando Luisi, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 890 days.

(21) Appl. No.: 11/385,158

(22) Filed: Mar. 21, 2006

(65) Prior Publication Data

US 2006/0235096 A1    Oct. 19, 2006

(30) Foreign Application Priority Data

Apr. 15, 2005    (IT) .......................... VA2005A0025

(51) Int. Cl.
C08G 18/48 (2006.01)
C08G 18/00 (2006.01)
C08J 9/00 (2006.01)
C08J 9/16 (2006.01)

(52) U.S. Cl. .............................. 521/131; 56/59; 56/170

(58) Field of Classification Search ................. 521/170, 521/56, 59, 131
See application file for complete search history.

(56) References Cited

U.S. PATENT DOCUMENTS

| 5,422,380 | A | | 6/1995 | Mendelsohn et al. |
| 6,022,912 | A | * | 2/2000 | Spitler et al. ................. 523/218 |
| 6,130,265 | A | | 10/2000 | Glueck et al. |
| 6,166,109 | A | * | 12/2000 | Spitler et al. ................. 523/218 |
| 6,414,046 | B1 | * | 7/2002 | Bogdan et al. ............... 521/131 |
| 6,605,650 | B1 | | 8/2003 | Roth ........................... 531/139 |
| 6,727,290 | B2 | * | 4/2004 | Roth ........................... 521/54 |
| 2004/0262805 | A1 | * | 12/2004 | Bostick et al. .............. 264/162 |

FOREIGN PATENT DOCUMENTS

CA    2241695 A1    12/1999
WO    95/11271 A1    4/1995

OTHER PUBLICATIONS

European Search Report, Application No. 06110058.2 date: Mar. 29, 2010.

* cited by examiner

*Primary Examiner*—Mark Eashoo
*Assistant Examiner*—Liam J. Heincer
(74) *Attorney, Agent, or Firm*—John W. Morrison; McGarry Bair, PC

(57) ABSTRACT

A method for the production of expanded polymeric materials; in particular for producing thermally insulating materials used in refrigerators. The method comprising the steps of providing a mixture of reagents based on isocyanate and polyol with the addition of expandable polystyrene-based microspheres, in which method the ratio by weight between the reagents and the expandable microspheres is between, about 7:1 and about 1:2.

10 Claims, No Drawings

METHOD FOR THE PRODUCTION OF EXPANDED POLYMERIC MATERIALS AND EXPANDED POLYMERIC MATERIAL OBTAINED BY THE METHOD

BACKGROUND OF THE INVENTION

1. Field of the Invention

The present invention relates to a method for the production of expanded polymeric materials, in particular for the production of polyurethane-based thermally insulating materials used in refrigerators.

2. Description of the Related Art

It is well known for expanded polymeric materials to be used in the production of insulating materials for refrigerators. A refrigerator (the term "refrigerator" being taken to mean any household electrical appliance for preserving foodstuffs, including freezers) essentially comprises a refrigeration unit located within/coupled with a container which is intended to keep foodstuffs at low temperature. The container is essentially constituted by a cabinet and a door, both of which are insulated. Over time, thermal insulation of the cabinet and the door has changed from the use of natural plant products such as cork to artificial products of mineral origin such as rock wool or glass fibre and finally to synthetic, expanded products. These latter products provide more consistent performance, better thermal insulation and furthermore contribute to forming the structure in combination with the inner shells (generally made of plastic) and the outer shells (generally made of sheet steel) of the cabinet and door.

The most commonly used material for thermal insulation of the cabinet and door is an appropriately formulated polyurethane resin (abbreviation: PU) with an added blowing agent. The polyurethane resin is in turn formed by the chemical reaction of two liquid components: one the polyol/polyether and the other an isocyanate, in the present case methylene diisocyanate, which is better known as MDI. The mixing/reaction of the two components (with an added blowing agent, for example, of the hydrocarbon type) occurs during the casting phase thereof within the air space formed by the outer shell and inner shell (liner) of the cabinet and/or door. Mixing the components gives rise to an exothermic chemical reaction, which ultimately results in the formation of the rigid expanded thermosetting polyurethane polymer. The blowing agent currently and most commonly used in Europe is a mixture of cyclopentane and isopentane, which is premixed with the polyol/polyether. Other blowing agents can, however, be used in refrigerator applications, for example R141b (India) or 245Fa (USA).

The exothermic reaction converts the blowing agent from the liquid phase (predispersed in the polyol) to the gaseous phase, so resulting in closed (non-intercommunicating) microcells within the polyurethane resin as it forms, which microcells impart elevated thermal insulation properties to the resin and simultaneously substantially reduce the apparent density of the "foam" formed (approx. 30 kg/m$^3$).

Under the thrust of the blowing agent, the resin grows in volume (creating the foam) and so fills the entire air space of the structure (cabinet or door). Exactly the correct weight of resin must be dispensed so that no voids are formed or, conversely, so that the foam does not become "overpacked" in the air space.

While it is still in the liquid phase, the resin is capable of "wetting" the surfaces with which it comes into contact. The resin has substantial adhesiveness and this permits good adhesion between resin (foam) and the shells of the cabinet and the door. In this manner, an overall structure is obtained which is rigid and stable over time.

Another material used for thermal insulation is expanded polystyrene, which is known as EPS. Its insulating characteristics, while being good, do not match those of PU and are dependent on its apparent density; the best thermal insulation is achieved at an apparent density of the order of about 27-28 kg/m$^3$. On the other hand, EPS is substantially lower in cost than PU.

The most commonly used blowing agent for EPS is pentane, which is added directly by the styrene resin producer in an amount of approximately 6% by weight or similar values. This resin, with the addition of the blowing agent, takes the form of solid microspheres (diameter of between, about 0.2 mm and about 0.7 mm). Given the volatility of the blowing agent, the material must be used (converted into its expanded state) within reasonably short periods or stored in tightly sealed containers. The expansion process takes place in two distinct phases, both on the moulder's premises: pre-expansion and final expansion/sintering. In the first phase, the microspheres or beads are heated with steam to a temperature such that the glass transition temperature (Tg), which is around 100° C., can be reached, thus enabling softening of the resin and expansion of the pentane predispersed therein, so forming beads with a diameter ranging from about 2 to about 4 mm. A fluidised-bed drying phase then follows, after which the beads are placed in suitable containers for the "maturation" phase. Expansion is around 95-97% of final expansion. The second expansion phase coincides with the actual moulding phase: the pre-expanded material is introduced into the mould that will impart the final shape to the part. The entire cavity of the mould is filled with the beads. After this operation, the final expansion and sintering phase is performed by introducing steam into the mould, which softens the beads and effects further and residual expansion of the pentane. The steam is introduced through the mould walls via numerous porous inserts that permit homogeneous diffusion of the steam within the entire cavity of the mould. This action results in the interstices between the individual spheroids being filled and simultaneously results in sintering thereof. A cooling phase follows before the parts are extracted from the mould. The processing range with regard to temperature has a lower limit at around 60° C. (the temperature at which expansion of the polystyrene begins) and an upper limit at a temperature of approximately 115-120° C. (above these latter values, the polystyrene begins to melt, causing the individual expanded spheroids to collapse). It is good practice to operate at between approximately 100 and 105° C. Parts with a good structure, but with limited surface hardness are obtained. A shell of plastics or metal can be introduced into the mould, the shell constituting one side of the finished part. During the final heating phase, the polystyrene beads adhere permanently to the inner side of the shell. The steam is introduced into the mould only from the side without the shell. It is much more difficult to introduce two shells into the mould, which would create a cavity as mentioned in the PU process for obtaining cabinets or doors. In practice, the presence of the vapour-impermeable shells makes introduction of the steam virtually impossible. The only option is to inject steam through the shell joints or through small holes made in the shells. The use of EPS as insulation and a structural component in refrigerators is thus greatly hindered by processing problems and by its lower insulating capacity. The use of EPS in refrigerators is thus conventionally restricted to premoulded fragments used as fillers in combination with PU. Another limitation on the use of EPS in refrigerators is that it is not completely impermeable to water vapour. Although the outer and inner walls of a refrigerator ought to provide a hermetic barrier to external gaseous agents, moist air can in fact pass through the joints in the shells (if they are not perfectly sealed) and, over time, penetrate within the EPS spheroids impairing their good thermal insulation properties.

A more widespread use is in thermal containers (for example, picnic coolers). In this case, the premoulded EPS part is mechanically assembled with two containment shells. As has been seen, the chemical reaction for the formation of PU, in conjunction with the expansion thereof, generates heat, while heat is required in order to achieve expansion of polystyrene. In the light of the above, the idea has arisen in the past of adding non-preexpanded polystyrene microspheres (with added pentane) to the polyurethane reaction mixture.

It has indeed been found that the heat of reaction of the PU is sufficient to soften and expand the polystyrene within the polyurethane composition, which is itself, expanded. Such a method is illustrated in U.S. Pat. No. 6,605,650 B1, with reference to the production of rigid structural articles.

Since the EPS microspheres that are formed are encapsulated by polyurethane resin they will be conveyed during the growing phase of the polyurethane foam and uniformly distributed. The disadvantage of the method described in the '650 patent resides in the fact that the ultimate object does not relate to maintaining or enhancing the thermal insulation properties of the polyurethane, and in the fact that the cost saving on the insulating material is very low given that the percentage by weight of polystyrene (relative to the weight of the sum of the polyurethane reagents) is no greater than 5%.

Furthermore, the method described in the '650 patent gives rise to a polyurethane matrix containing a plurality of microcavities lined with polystyrene, which arise from microspheres that have expanded and collapsed. This is deleterious with regard to achieving good thermal insulation properties and means that the technology described in the '650 patent cannot be applied to the production of insulating materials for refrigerators.

SUMMARY OF THE INVENTION

The aim of the present invention is accordingly to provide a method for the production of expanded polyurethane articles, in particular thermal insulation structures for use in household electrical appliances for preserving foodstuffs, which method, while permitting a reduction in cost thanks to the use of expanded polystyrene in combination with polyurethane, maintains or improves thermal insulation performance.

Over the course of numerous experimental trials, the applicant has defined the parameter for achieving the result, this being the polyurethane reaction temperature, which in turn is closely correlated with the percentage of polystyrene microspheres used in the method. While in the case described in the United States patent, the reaction temperature exceeded the glass transition temperature of the polystyrene, so resulting in the collapse of the spheroids after they had expanded in the polyurethane matrix, according to the present invention the use of a predetermined percentage by weight of polystyrene spheroids (in any event, greater than that described in the patent) makes it possible to control accurately the reaction temperature of the PU, so avoiding any collapse of the expanded polystyrene microspheres, and to retain in the latter a substantially "spongy" structure which is ideal for thermal insulation purposes. It is clear that the percentage of polystyrene used in the expanding mixture is also critical because, once predetermined values are exceeded, the cooling (or "quenching") effect on the polyurethane crosslinking reaction is excessive, such that it does not permit sufficient expansion of the polystyrene microspheres, with a final result that is not ideal either with regard to foam density (excessively high) or in terms of sub-optimal thermal insulation. In order to overcome these disadvantages, it is thus necessary to act on process parameters such as the temperature of the reactive components (polyol and MDI), and the structure to be filled (cabinet or door). As temperature rises, so too do the reactivity and speed of growth of the expanded composition. Furthermore, the temperature of the expanded composition being formed is not uniform through its thickness, being lower close to the outer walls and higher in the centre ("core"). Moreover, temperature is also dependent on thickness, in that the greater is the thickness the higher will be the "core" temperature. The temperature values are thus being accurately monitored and controlled so as to avoid low values that could inhibit expansion and, conversely, overheating of the expanded composition, which would result in melting of the polystyrene and thus in the collapse of the EPS microspheres. It is good practice to maintain the maximum temperature within a range of no less than 90° C. close to the walls and no higher than 120° C. in the core.

Preferred values of the ratio by weight between polyurethane (taken to mean the sum of reagents) and polystyrene are between, about 7:1 and about 1:2, corresponding to percentages by weight of polystyrene to be used in the mixture varying between, about 12% and about 66% by weight. More preferably, the ratio by weight between polyurethane and polystyrene is between, about 5:1 and about 1:1, corresponding to percentages by weight of polystyrene to be used in the mixture of between, about 16% and about 50% by weight. The average diameter of the expanded microspheres in the polyurethane matrix is preferably between, about 3 and about 6 mm, more preferably between, about 4 and about 5 mm, starting from EPS microspheres having a diameter of the order of about 0.5 mm.

Polystyrene is taken to mean any styrene homopolymer or copolymer containing at least 50% by weight of styrene. Possible examples of comonomers that are used are $\alpha$-methylstyrene, halogenated aromatic styrenes or alkylated aromatic styrenes etc. It has proved particularly advantageous to use polystyrene microspheres with added reflective agents (for example graphite), which increase the insulating capacity of the expanded microspheres. For example, microspheres sold by BASF under the trade name Neopor® can be used.

Encapsulation of the EPS spheroids by the PU creates a surface around the EPS spheroids that is impermeable to gases and vapours, so ensuring that the thermal insulation is constant and lasting over time in the same manner as PU.

In the method according to the invention, it is important to achieve accurate control of the reaction temperature with the aim of obtaining maximum expansion, but without exceeding the melting point of the polystyrene. Should the latter case arise, the expanded polystyrene beads may collapse, forming the same number of cavities as there are expanded beads and of dimensions similar to those of the beads themselves. This would be deleterious with regard to thermal insulating properties.

The maximum reaction temperature is preferably between, about 85° and about 125° C., more preferably between, about 90° and about 120° C.

Practical experimentation has involved the production of a refrigerator cabinet and introducing a mixture of the above-described type into the cavity constituted by the air space between the inner liner of the cabinet and the outer cover.

In order to facilitate flow of the composition (PU+EPS) during the expansion phase, the addition of fluidising substances is provided, these preferably being selected from the group consisting of silicone oils, mineral oils or mixtures thereof.

This measure substantially facilitates filling of the entire cavity, including small interstices, with the PU+EPS mixture.

Adhesion of the polyurethane resin to the shells of the cabinet is not impaired, so ensuring that structural properties are maintained unchanged. This is because, during the growth (foaming) phase, the mixture comprises the polyurethane liquid phase which wets and adheres to the walls of the shells.

The applicant's research has also focused on achieving a ratio by weight between polystyrene and polyurethane (ideal for the purposes of reducing costs) of approx. 50%:50% and with a final total density of no greater than about 30-32 kg/m$^3$ (equal to pure PU foam). In order to achieve this aim, particular attention has been paid not only to the measured quantities of the individual components of the PU and to the other components of the formulation (blowing agent, catalysts, surfactants, water) but also to processing conditions (temperatures of the components and the structural parts) such that the exothermic nature of the polyurethane expansion reaction, while ensuring optimum expansion of the polystyrene, does not impair expansion of the polyurethane.

The polymerisation time (curing time) is substantially unchanged relative to the polymerisation time of a conventional polyurethane mixture. On completion of polymerisation, the polyurethane resin is completely cross-linked, chemically, and thus in rigid solid form and, while maintaining residual heat, does not permit further expansion of the EPS, which could result in deformation of the structures (cabinets and doors) once removed from the holding jig in the foaming installation.

The method for injecting the polyurethane components within the shells remains almost unchanged, but there is provision for the addition of an assembly comprising a unit for dispensing the polystyrene microspheres, a unit for mixing the microspheres with the polyol (formation of a slurry or "slush") and a pump for dispensing the slurry to the mixing and injection head, which operates synchronously with the dispensing of the other components. The injection head is preferably of the three-way type. The piping and jet for conveying the slurry were given dimensions aimed at ensuring free flow without the formation of build-ups that would compromise the uniformity and dispensing of the mixture. Final mixing of the three streams (isocyanate, polyol and microspheres) occurs simultaneously during the phase of injecting the mixture into a cavity of a structure, for example the air space of a cabinet or door of a refrigerator or similar household electrical appliance.

EXAMPLES

A polyurethane system from ELASTOGRAN (a division of BASF) was used in the tests. In particular, the polyol used was ELASTOCOOL 2030/100/OT, the isocyanate (MDI) was ISOPMDI 92140 and the blowing agent was a mixture of cyclopentane (70% by weight) and isopentane (30% by weight). The ratio by weight in which the above-stated three components were used was as follows:
Polyol=100
Isocyanate=144
Blowing agent=13

The polyol already contained added catalysts, fluidising agents, surfactants and water, specifically for application in refrigerator insulation. These additives did not prove critical for the purposes of the invention, either with regard to composition or to percentage content.

The expanded polystyrenes used were a material from Polymeri Europa with the trade name LEONARDO 5000 and a material from BASF with the trade name STYROPOR, but no significant differences were found.

The results of the tests, in which the starting temperature of the components was 24° C., are summarised in the following table in which the ratio between PU (taken to mean the sum of the reagents) and EPS is taken to mean a ratio by weight and in which $T_{core}$ is taken to mean the maximum temperature detected in the core of the expanding mixture:

| Test no. | PU:EPS | $T_{core}$ (° C.) | Density (kg/m$^3$) |
|---|---|---|---|
| 1 | 5:2 | 118 | 38 |
| 2 | 5:3 | 106 | 33 |
| 3 | 5:4 | 100 | 30 |
| 4 | 1:1 | 90 | 50 |
| 5 | 1:1 | 110 | 32 |

The values in the table relate to tests carried out on a test mould in the shape of a parallelepiped and with a thickness of 80 mm, which is similar to the thickness of the insulation present in standard production freezers (75 mm). In practice, refrigerators/freezers do not have insulation of a constant thickness, typical examples being products known as "combined", "twin door" and also "side-by-side" appliances, which are the combination of two cabinets in a single structure, a refrigerator and a freezer, and which each have insulation of substantially different thicknesses and in which the expanded composition is injected in a single operation with a single injection head. The process parameters (temperatures) will be established from time to time for each type of household electrical appliance and will be substantially a compromise to optimise the expansion and the density of the mixture of PU and EPS.

Test 5 was carried out with the same ratio by weight between PU and EPS as in test 4, but the starting temperatures of the PU components were varied (increased).

It will be noted how in test no. 4 the high percentage of polystyrene absorbs too much of the heat of reaction, so preventing the EPS spheroids from reaching a softening temperature such as to provide expansion.

In the course of other tests, it was noted that, with an identical weight of EPS, as the grain size (diameter of the polystyrene microspheres before expansion) increases, the final density of the manufactured product falls.

By using the values from the examples, it has proved possible to make combined use of the expanded polyurethane and the expanded polystyrene as an insulating material for domestic refrigerators, while obtaining insulation having structural properties identical or similar to those of PU, an insulating capacity comparable with that of PU and with a material cost equal to the weighted mean of the PU and the EPS.

It has been established that, in order to achieve the aim of obtaining insulation suitable for domestic refrigeration appliances, the individual EPS microspheres must retain their structural integrity, i.e. they must not melt on exposure to the heat of reaction and form cavities lined with a thin layer of polystyrene which would impair the insulating capacity of the PU+EPS mixture.

It has been found that encapsulation of each individual EPS spheroid by the PU provides that the spheroids are impermeable (whether inward or outward) to gases and water vapour.

If this were not the case, this permeability would permit the water vapour (ordinarily present in air) to enter the microcavities of the EPS, so impairing its good insulating properties. This provides that the PU+EPS mixture provides thermal insulation performance that is constant over the period of service of the refrigeration appliance.

Dispensing and mixing of the polystyrene beads, before expansion, preferably takes place with a fraction by weight of one of the two components of the polyurethane, the polyol or the isocyanate, before the latter are mixed and injected inside the structure of the cabinet or door of the refrigerators. In this manner, all the beads are wetted by the polyol (or, respectively, the isocyanate) in such a manner as to provide either their subsequent encapsulation in the polyurethane that will form during the polymerisation phase or the transmission of the heat of reaction from the polyurethane to the beads, enabling the final expansion thereof.

The invention claimed is:

1. A method for producing expanded polymeric foam in a cavity of a structure, comprising:
    mixing expandable polystyrene-based microspheres with at least one of a polyol and an isocyanate to form a slurry of wetted microspheres;
    simultaneously introducing the slurry, isocyanate, and polyol into the cavity to form a final mixture;
    controlling the polymerisation temperature of the final mixture to yield a foam having an expanded bead size of 3-6 mm and a density of less than 38 kg/m$^3$;
    wherein the isocyanate and polyol form the reagents and the ratio by weight between the reagents and the expandable microspheres of the final mixture is between about 7:1 and about 1:2.

2. The method according to claim 1, further comprising the step of providing the ratio by weight between the reagents and the expandable microspheres of between, about 5:1 and about 1:1.

3. The method according to claim 2, wherein the step of controlling the polymerisation temperature avoids the collapse of the polystyrene-based microspheres.

4. The method according to claim 3, further comprising the step of maintaining the polymerisation temperature within a range of between, about 85° and about 125° C.

5. The method according to claim 3, further comprising the step of maintaining the polymerisation temperature within a range of between, about 90° and about 120° C.

6. The method according to claim 1, further comprising the step of adding a fluidising substance to the reagents and the microspheres.

7. The method according to claim 6, further comprising the step of choosing the fluidising substance from the group consisting of silicone oils, mineral oils or mixtures thereof.

8. The method according to claim 1 wherein the resulting foam has a density of about 30 kg/m$^3$.

9. A method for producing expanded polymeric foam in a cavity of a structure, comprising:
    mixing expandable polystyrene-based microspheres with at least one of a polyol and an isocyanate to form a slurry of wetted microspheres;
    simultaneously introducing the slurry, isocyanate, and polyol into the cavity to form a final mixture;
    controlling the polymerisation temperature of the final mixture to yield a foam having an expanded bead size of 3-6 mm and a density of less than 38 kg/m$^3$ with the microspheres retaining their structure;
    wherein the isocyanate and polyol form the reagents and the ratio by weight between the reagents and the expandable microspheres of the final mixture is between about 7:1 and about 1:2.

10. A method for producing expanded polymeric foam in a cavity of a structure, comprising:
    mixing expandable polystyrene-based microspheres with at least one of a polyol and an isocyanate to form a slurry of wetted microspheres, without pre-expansion of the microspheres;
    simultaneously introducing the slurry, isocyanate, and polyol into the cavity to form a final mixture;
    controlling the polymerisation temperature of the final mixture to yield a foam having an expanded bead size of 3-6 mm and a density of less than 38 kg/m3 with the microspheres retaining their structure;
    wherein the isocyanate and polyol form the reagents and the ratio by weight between the reagents and the expandable microspheres of the final mixture is between about 7:1 and about 1:2.

* * * * *